Dec. 5, 1967 P. G. BRUNDELL ET AL 3,356,116
METHOD AND MEANS FOR FOREST HARVESTING
Filed March 8, 1965 3 Sheets-Sheet 3

Per Gunnar Brundell
Karl-Erik Arnold Jonsson
Inventors
by Greer Marechal Jr.
Attorney United States Patent Office 3,356,116
Patented Dec. 5, 1967

3,356,116
METHOD AND MEANS FOR FOREST
HARVESTING
Per Gunnar Brundell and Karl Erik Arnold Jonsson,
Gavle, Sweden, assignors to Brundell & Jonsson Aktiebolag, Gavle, Sweden
Filed Mar. 8, 1965, Ser. No. 437,829
Claims priority, application Sweden, Mar. 6, 1964,
2,819/64
3 Claims. (Cl. 144—326)

ABSTRACT OF THE DISCLOSURE

A combination apparatus and method for felling trees and reducing them to chips in the substantially inaccessible area of a stand of trees, and thereafter conveying the chips pneumatically from the place of felling through the stand of trees to an area substantially accessible to large trucks or other conveyances where the pneumatically conveyed chips can be easily loaded for shipping.

Figure 1:
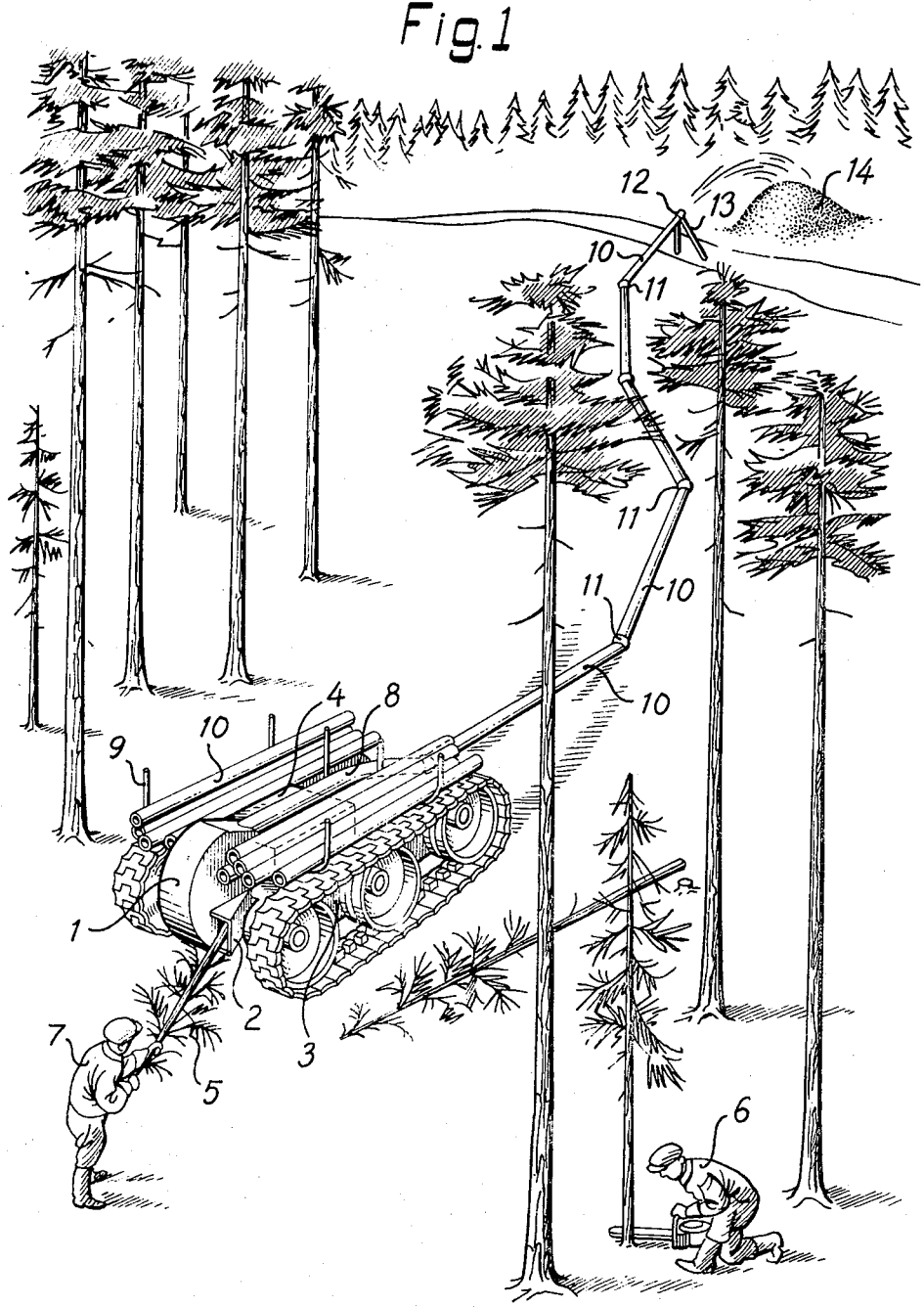

Felling trees today normally includes the following operation to be performed by the lumberjack:
To fell the tree with a power saw;
To branch the tree with an ax or a power saw;
To buck the tree in desired pieces;
To stack the pieces of the stump or to drag them by hand to a strip road and stack them there.
The following work (skidding) is then performed by another worker:
He loads the pieces on a vehicle either by hand or with a loader;
He drives the vehicle to a landing;
He unloads and stacks the pieces at the landing.
On the landing the following work is done:
Barking by a portable debarker;
Loading the wood on a truck for further transportation to waterway, railroad or directly to a mill.

Since the middle of the fifties many machines and techniques for mechanization and increasing efficiency of logging operations have been suggested—especially in Russia, Canada and the United States.

Two main roads of approach to the problem have crystallized.

According to one method the tree is delimbed and the top of it cut off by a machine while the tree is still standing. The same machine then cuts the tree off at the base and puts it down on the ground in a stack. This stack is then hauled to the landing by a tractor and the trees are loaded on a truck with a fork lift.

According to the other method the trees are felled with a power saw and then—unbranched—dragged to a processing area either by a winch or by a tractor which is equipped with a boom and grapple. A multiprocessing machine accomplishes delimbing, barking, bucking and stacking simultaneously. Finally a mechanical loader puts the pieces on a truck.

The mechanized methods outlined above are almost exclusively suited for clean cutting since the dragging of full length trees in thinned stands—if such a thing is possible at all—would seriously damage the remaining trees.

It is estimated that in the future 60% of the Swedish forest production will come from clean cuttings and 40% from thinnings.

Since the percentage of lumber is large in clean cuttings and small in thinnings not less than half of the pulpwood will come from thinnings even in the future.

Quite naturally the average tree size from clean cutting is considerably larger than the average tree from thinning.

It is well known that the logging cost per unit volume of wood increases as the average tree dimension decreases; below 8" breast height diameter the tendency toward increased costs is progressive.

Merchantable yield from trees with less than 5" breast height is usually nonprofitable even if the cost for felling the tree is accounted for as a silvicultural expense.

The proposed methods for mechanization have therefore tended to increase the cost gap between thinning and clean cutting. In other words up to now mechanization has cut logging costs for the wood that is rather cheap to harvest by conventional methods, while the cost for wood from thinnings increases. Therefore, the trend in forestry is to reduce thinning operations to the point where they are performed only to prepare for mechanization through clean cuttings.

Through combination of pieces of equipment largely known per se the present invention, however, offers a method for harvesting tree stands by thinning or clean cutting which makes feasible a drastic increase in production per man-day, especially when employed on stands with small trees.

Basically the method comprises comminuting whole trees or desired parts thereof to chips with a portable chipper that is moved through the stand close to the growing site of the trees to be harvested and, substantially continuously as they are produced, conveying the chips pneumatically through a flexible pipe line or hose from the chipper to a predetermined point of collection. There the kinetic energy of the chips is preferably utilized to automatically perform a loading operation.

By comminuting the tree to chip form close to its stump and then moving the chips through the terrain pneumatically the skidding operation can be automated and will consequently require a minimum of manual labor. Eliminating shuttle traffic of bulky transport vehicles through the thinned stand results in minimum damage and depreciation to the remaining trees.

To visualize the present invention three figures will be relied upon.

FIGURE 1 shows a perspective view of a simple embodiment of the invention where a high speed chipper 1 with a horizontal infeed spout 2 is mounted on a tracked vehicle 3, the engine 4 of which also powers the chipper. A small tree 5, that has been felled with power saw by the worker 6, is fed into the chipper 1 manually by the worker 7. The chipper 1 is equipped with fan blades and due to high rotational speed the chipper will also act as a blower and causes a substantial stream of air to convey the chips, as they are being produced, through the pipe 8 connected to the outlet spout of the chipper hood. In brackets 9 arranged on the side of the tracked vehicle 3 are carried lightweight pipe sections 10. As the tracked vehicle moves forward through the stand one after the other of the sections 10 are connected to the end of the chipper discharge pipe 8 by means of irrigation-type quick couplings 11 allowing some angular flexibility (up to 15°). The forward end 12 of this pipe line is carried by a support 13 in order to have the airstream from the chipper-blower throw the chips to form a pile 14.

At the landing it is easy to—without any manual effort—either temporarily store the chips by piling them or load them directly onto a trailer by connecting the open end of the tube to it. If the trailer can be parked on the truckroad, landings are not required. A practical embodiment of the invention is to mount the chipper on a tractor, the motor of which does not only drive the chipper but also a compressor and a chip feeder. The latter two units are also mounted on the tractor together with an equalizing bin. The chips are thrown into the bin due to the rotation of the chipper disc.

The chip feeder (preferably of the star wheel type) is located at the bottom of the bin, which is shaped like a truncated cone pointing downward (a cyclone). The chips are fed into a piece of pipe which is connected to the pressure side of the compressor. The pipe goes to the rear end of the tractor, where the pipe is connected to a flexible hose. The hose is kept inflated by the pressurized air going through it. The hose can, with the moderate diameter of 6″ and a power consumption of 40 HP, transport large quantities of chips—350 cu. ft. of solid wood per hour over the longest distances generally encountered in skidding, say, 1600 feet. In addition to this the hose can also, at the landing, load and hard pack the chips into a vehicle suitable for transportation to the processing mill.

Figure 2:
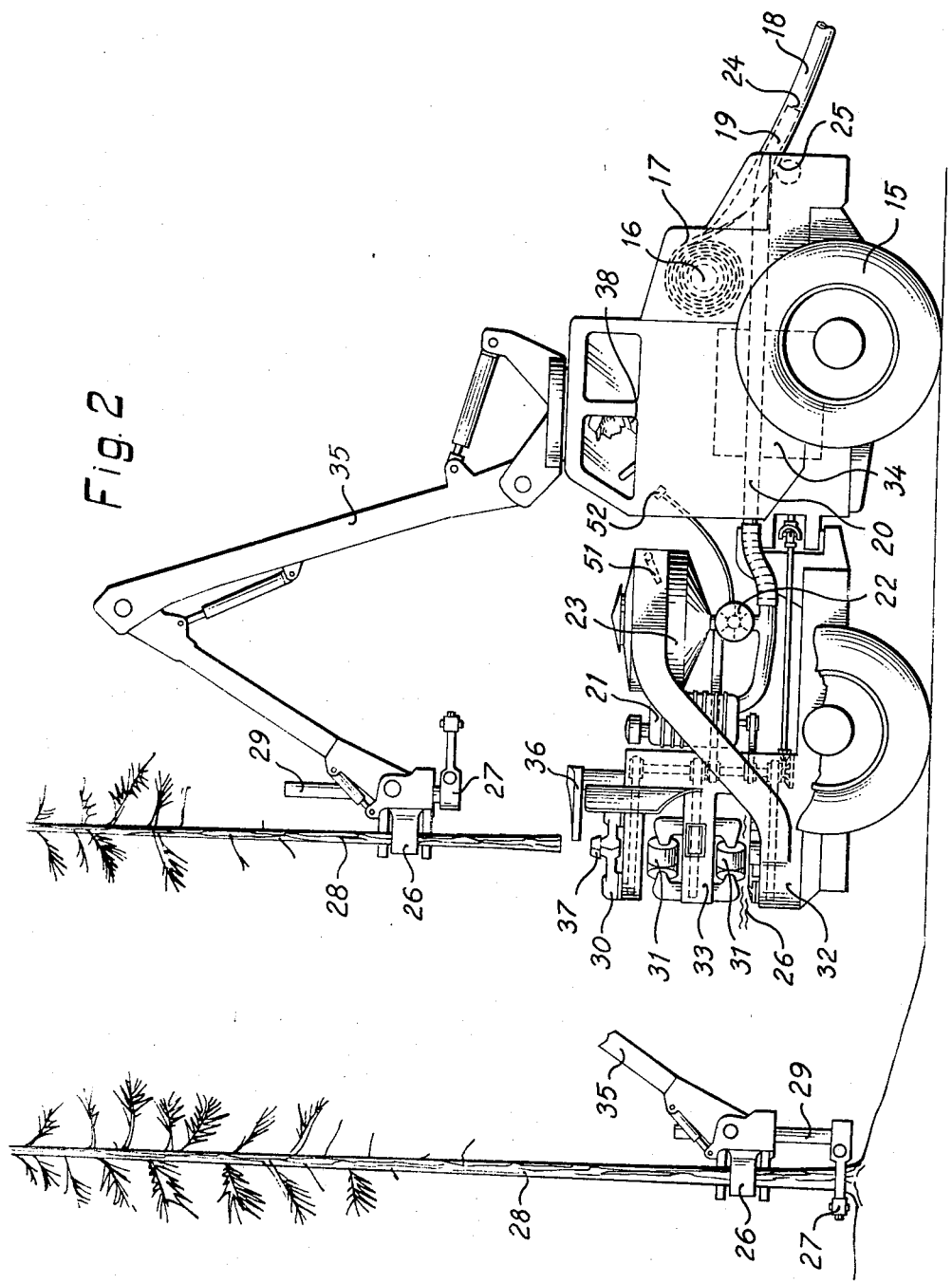

A hose arrangement allowing continuous elongation of the hose from the tractor mounted chipper as it moves through the stand is shown in FIGURE 2.

On the rubber wheeled articulated frame vehicle 15 is mounted a drum 16 on which is wound a flat strip 17 of some flexible base material like neoprene impregnated nylon fabric. The width of the flat strip is equal to the circumference of the desired hose 18. At its longitudinal edges the strip is provided with means for locking them together, for example an industrial zipper. As the tractor moves the strip is rolled off the drum—folded latitudinally to form a hose 19 and the edges zipped together. The pressure line 20 from the compressor 21 (in which the star feeder 22 feeds chips from the equalizing bin 23) ends in a nozzle 24 surrounded by the flexible hose 18 just after the zipping zone 25. Through a labyrinth or a sliding seal the outside of the nozzle 24 seals against the inside of the hose 18 so that the stream of chips can be transferred to the flexible line without any substantial loss of the conveying, pressurized air.

The outlined arrangement means that the vehicle can carry the hose for the pneumatic transport in a manner so as to occupy the minimum amount of space. As the vehicle moves it continuously lays out or takes in the amount of hose required.

A very advantageous way of handling trees in connection with the present invention is to never let the trees fall to the ground. Instead—after the tree is severed at the base—the tree is moved in substantially vertical position until it is above the chipper feed spout. It is then fed down through the chipper and the entire chip conversion operation is performed with the tree retaining a roughly vertical position.

Moving the trees in their original vertical position from stump to chipper is especially advantageous when working in dense stands, where it can be difficult to find the space for conventional felling. For the small moving distances required—maximum 15–30 feet—a suitable knuckle boom with grapple can conveniently be mounted on the vehicle 15, as appears from FIGURE 2.

The method outlined above for handling the trees with intact vertical position from stump to processing machine can give further advantages. By combining the clamping means 26 in FIGURE 2 with a slasher the conventional felling operation with a power saw can be eliminated. The slasher 27 could preferably be a scissor-type pair of sharp shears, hydraulically powered and designed to cut off a tree approximately one second. The felling operation is thus included in the necessary operation of bringing the handling boom to the tree 28. This combination of clamping, cutting off and moving the tree in vertical position results in decreased manual work per unit volume of processed wood.

To facilitate insertion of the tree 28 in the processing assembly the slashing means 27 are arranged to slide vertically and swing away from the tree horizontally along the rod 29.

Lifting the tree up from the stump immediately after having cut it off excludes the risk of soiling it with sand and gravel, which has a damaging effect on chipper knives and consequently also on the chip quality.

The comminution of whole trees produces a chip quality suitable either as fuel or as raw material for wallboard. This method can be practical for the very small dimensions involved in clearing and precommercial thinning operations. With present methods it is uneconomical to even try to make use of those small dimensions.

Mounting a delimbing machine 30 followed by a suitable feedwork 31 directly ahead of the chipper 32 in the feed direction in such a manner as to perform delimbing and chipping at the same time produces a bark containing chip quality which is directly usable for wallboard and some semi-chemical pulps. By utilizing physical separation methods a chip quality can be produced which has such a low bark content that the chips are well suited for the manufacture of kraft sulphate pulp. The bark fraction separated is a good fuel.

By arranging immediately ahead of the chipper 32 not only a delimbing machine but also a debarker 33 (example: our American Patent No. 2,857,945)—or a machine which both delimbs and debarks (example: Swedish Patent No. 27,969 or No. 41,554), it is possible within a fraction of a minute after the tree has been touched by the grapple to have the tree loaded in the form of high quality chips on a trailer hundreds of yards away from the growing site of the tree, ready to go directly to a pulp mill without further handling.

This entire chain of operations from the growing tree in the stand to chips loaded on a vehicle can be accomplished by one single man whose work load level can be compared to that of a power shovel operator.

The above described combination of elements, which includes a base vehicle 15 and motor 34 also includes a boom 35 with grapple 26 and slasher 27, delimbing machine 30, debarker 33, chipper 32, equalizing bin 23, chip feeder 22 and means for pneumatically conveying the chips through the terrain from the base machine to a desired point of collection.

Such an arrangement makes possible a substantial decrease of manual labour in harvesting operations, as will be shown with calculations over a thinning operation.

If the chipper is made in accordance with our pending U.S. patent application No. 389,536, the power consumption per unit volume of comminuted wood is considerably lower than for conventional chippers. The chips produced are of high quality due to uniformity and freedom from compressing damage. Embodied in the principle of the chipper just referred to is that the chipper itself acts as a screen for wood particles larger than the chip length. This property is especially important in conjunction with the pneumatic transport through a hose which could be easily choked by larger splinters and chunks of wood.

Since the tree is green when it is being chipped and it is fed in its entire merchantable length—preferably in vertical position—ideal conditions for the formation of chips are at hand. The quality of chips produced in the forest close to the stump should be at least as good as any chip than can be produced by stationary chippers at the mill.

For comparatively small pulp wood dimensions branches and bark constitute approximately 40% of the entire weight of the tree (stump excluded). Delimbing and barking as described above result in avoidance of chipping and transportation of large quantities of material of comparatively low value. Instead this material is spread rather evenly in the harvested stand.

To leave branches and bark on the ground is in many places desirable and sometimes imperative from a biological point of view.

The arrangement just described can go very far down in tree size but still a limit will be reached below which the machine cost per unit of time divided with the volume of wood processed per unit time exceeds the value of the chips produced. The tree diameter below which processing is nonprofitable is approximately 1½–2″.

For cutting off the top and removing it from the machine we proposed the following simple arrangement to serve both purposes (see FIGURE 2).

In the feed direction of the tree immediately ahead of the delimbing unit 30 is mounted an arm 36 which can be swung or pushed substantially perpendicular against the tree which is being processed. When the arm 36 is pushed against the tree top the latter is quickly bent or moved out of center and the trunk (which at this point is not thicker than a large branch) is cut off by the delimbing cutters 37. The advancing arm 36 then throws the top away from the machine and onto the ground.

motor is also used to advance the machine through the terrain. The total width of the combine is not more than 8 feet, which means that it can go between the remaining trees in the thinned stand, so that no special openings have to be made.

A chart showing the tree distribution over a representative area in the Swedish province of Halsingland before and after a precommercial thinning operation serves as a basis for the calculation of the production capacity of the aforementioned apparatus under actual conditions.

From the calculations have been omitted trees with a D.B.H. of less than 2½″ (due to insignificant merchantable yield) and more than 7¼″ D.B.H. (due to diameter limitation of the combine). The results of the calculations are shown in the following chart.

| Diameter, D.B.H. over bark | Thinned Pieces | Tree Length | | Merchantable Length (above 2″ diameter) | | Merchantable Volume | |
|---|---|---|---|---|---|---|---|
| | Pieces/acre | Ft./piece | Ft./acre | Ft./piece | Ft./acre | Cu. ft./piece | Cu. ft./acre |
| 2½–3¼″ | 178 | 22 | 3,920 | 9 | 1,600 | 0.4 | 70 |
| 3¼–4¼″ | 137 | 27 | 3,700 | 16 | 2,190 | 0.8 | 110 |
| 4¼–5″ | 101 | 32 | 3,230 | 21 | 2,120 | 1.5 | 150 |
| 5–5¾″ | 48 | 37 | 1,780 | 26 | 1,250 | 2.3 | 110 |
| 5¾–6½″ | 16 | 41 | 660 | 29 | 460 | 3.2 | 50 |
| 6½–7¼″ | 12 | 45 | 540 | 32 | 380 | 4.3 | 50 |
| | 492 | | 13,830 | | 8,000 | | 540 |

Fraction merchantable length = 8,000 ÷ 13,830 = 0.58.
Merchantable volume per tree = 540 ÷ 492 = 1.1 cu. ft.
Average tree length = 13,830 ÷ 492 = 28 feet.
Merchantable volume per foot tree length = 540 ÷ 13,830 = 0.039 cu. ft/ft.

The operator 38 can give the impulse that starts the movement of the arm which will accomplish tree top cutting in this manner. Since the operator's most important task is to grab, cut off and move the next tree to the infeed opening of the delimbing machine it is both advantageous and desirable that the feedworks 31 of the debarker gives the impulse that automatically starts the arm movement which results in tree top cutting when a trunk of predetermined minimum diameter reaches it.

It should be pointed out in this connection that the operator can remove the grapple 26 as soon as the oncoming end of the tree has reached the lower feedwork 31. The operator then immediately starts the cycle to get the next tree to the processing assembly.

An example with figures from the thinning of comparatively small diameter trees will be given to elucidate the techincal effect of an arrangement conforming with the invention.

Assuming that the apparatus is arranged as illustrated in FIG. 2, which shows a side view of the combine. Hydraulic slasher, delimbing machine, debarking machine and chipper are designed for a feed speed of 200 feet per minutes and the maximum stump diameter of the processed trees may be about 10 inches which corresponds to a maximum allowable D.B.H. (diameter at breast height of 7½ inches over bark. The total weight (the stump excluded) of such a tree does not exceed 700 lbs. and if this weight is lifted by a grapple boom with a largest reach of 25 feet, the highest bending moment generated by the load will not be larger than 17,500 lb.-ft. For every 100 yards of movement of the combine it can cover ¼ acre with a 25 feet reach.

The equalizing bin has a 70 cu. ft. chip capacity which is equal to the merchantable wood volume from 5 of the largest size trees that the combine can process. The compressor delivers 1,100 cu. ft. of free air per minute. The hose can be rolled out 1,600 feet and the compressor must be capable of delivering the aforementioned volume of free air at a gauge pressure of up to 10 p.s.i.

The maximum horse power requirements for the various components on the combine require a peak load demand which is met with one 250 HP diesel motor. This If the combine is in operation 7 hours a day and the actual use of the theoretically possible feed speed (200 f.p.m.) is 50%, calculated on the full tree length (not merchantable length only) the daily production is not less than $7 \times 60 \times 200 \times 0.5 \times 0.039 = 1,600$ cu. ft. or 19 cords. This is equal to 1,450 trees or an area of 3.0 acres. To cover this area the combine moves 1,200 yards.

The number of cords containing approximately 84 cu. ft. of solid wood per man-day is commonly used as a yard stick to indicate the degree of mechanization of tree harvesting operations. This figure is 19 in the case just studied. This is an amazingly high figure. Even if it should be difficult to handle 1,450 trees per day and the production dropped down to half of this, the productivity would be around 10 cords per man-day, which is still a very good figure. If this figure in its turn should be halved to 5 cords per man-day by charging the operation with a second man in addition to the operator on the combine, a point is reached where known mechanized harvesting systems employed on normal pulpwood size trees stand today.

It should be noted that the latter methods and machines are working with considerably larger diameter trees and have yet not gone to the same degree of processing (chipping) as in our case.

In the chosen example merchantable yield is as small as 1.1 cu. ft. per harvested tree. Should this figure be brought up to 1.5 cu. ft. per tree (refrain in the chosen example from processing the 178 smallest trees which only contribute 70 cu. ft.) 900 trees per day or an average of two trees every minute during an eight hour shift need to be processed to keep up a daily production of 1,400 cu. ft. or 17 cords. The use of one machine operator and one assistant will result in a productivity figure of 8½ cords per man-day.

Figure 3:
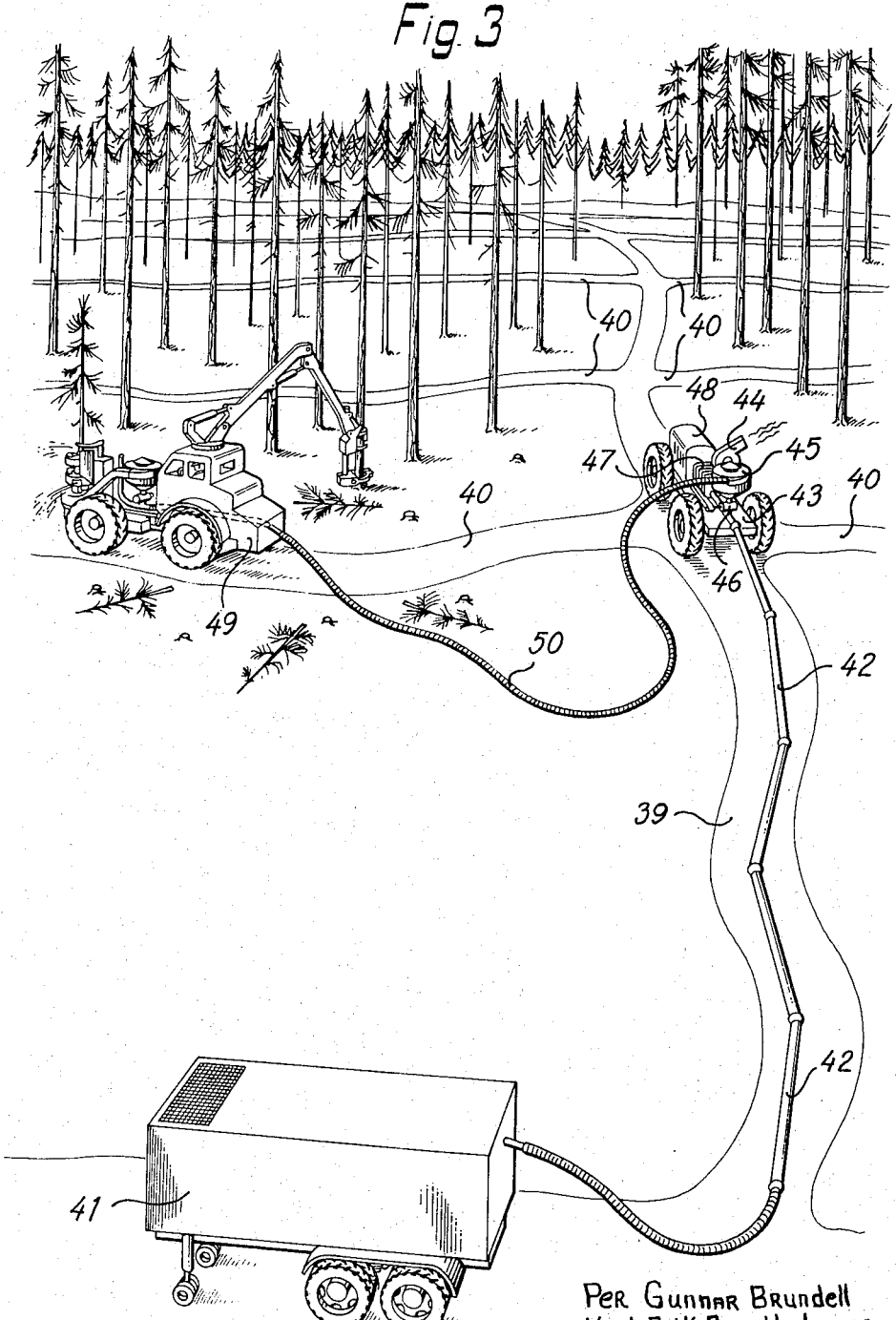

This far only thinnings have been mentioned. It is obvious, however, that the proposed method for harvesting trees is equally advantageous for clean cuttings when no timber is produced but the entire merchantable yield is utilized as pulp wood. The overall dimensions of a combine conforming to the invention increase rapidly as the allowable maximum tree diameter increases. However, at an 18″ maximum diameter processing capability the arrangement still has reasonable dimensions. To be able to meet the peak horse power requirements in such a case, it is convenient to arrange a torque converter between the drive motor and delimbing machine—debarker—chipper. With a torque ratio of 3:1 in the converter, a 250 HP drive motor is used and a maximum feed speed of 150 f.p.m. is obtained. The dimensions of the compressor and the hose will quite naturally have to be increased compared to those earlier mentioned in conjunction with the combine version intended for thinning operations. Clean cuttings do not put so severe restrictions on vehicle width as thinning operations do and the laying out of the pneumatic transport tube is less constrained. One very practical version of the invention, under certain conditions, is illustrated in FIGURE 3. Roughly perpendicular to both sides of what with present terminology would be called a haul or main strip road 39 and which can be comparatively long are laid out, equally spaced (appr. 50 feet apart) short, straight strip roads or openings 40 (appr. 300 feet. long). From a trailer 41 parked on a landing along the haul road is laid out a pipe line, made up from light weight sections provided with quick couplings of the type used in the irrigation of farm land. These couplings allow a limited angular movement between two consecutive pipe sections.

On a vehicle 43 which can move along the haul road 39 is mounted a suction fan 44, a chip separator which also serves as an equalizing bin 45, a chip feeder 46, a compressor 47 and a drive engine 48. Harvesting is done in the following way. The mobile chipper 49, illustrated substantially as in FIGURE 2, moves into the stand along a strip road 40 and pulls with it (or lays out) a hose 50 connected to the chipper or to a suitable equalizing bin. This hose 50 is connected with its other end to the suction fan 44 and must be well able to withstand the vacuum created by the fan. From the chip separator 45 the chips are fed by the star feeder 46 into a pipe which has one end connected to the pressure side of the compressor 47 and the other end connected by a coupling to the pipe line 42 which is laid out along the haul road. This mobile chip transfer station can easily be made automatic and will then not require an operator.

With the system just described the mobile chipper (or the combine) can be relieved from means required to accomplish the pneumatic chip transport. Thus the manoeuvrability of the mobile chipper in the terrain is increased and at the same time it is possible to use a larger compressor and consequently a longer pipe line to a more distant landing. To move the chip transfer station along the haul road adding new sections to the pipe line does not need to be done more often than for, say, every third pair of strip roads. With a strip road of 300 feet on each side of the haul road and a spacing of 50 feet an area of 2 acres can be harvested before the transfer station has to be moved. Harvesting such an area is approximately what can be accomplished in one day when carrying out a concentrated thinning operation.

Even if it should be necessary to move the transfer station two or three times a day—due to very thin stands—it is possible to keep the time required for such movements within limits that will not markedly influence the output from the mobile chipper.

In conjunction with harvesting operations according to the present invention it is possible to continuously measure the wood volume produced. The procedure is as follows. Reference is made to FIGURE 2.

Inside the equalizing bin 23 a chip level sensing device 51 is located. When the chip level is below a predetermined value, the level sensing device 51 gives an impulse to an electromagnetic clutch on the drive shaft for the chip feeder 22. The shaft becomes disengaged and the chip feeder stops. When the chip level rises, the chip feeder is started again. Due to this interaction the chip feeder—when working—will always work with full volumetric efficiency, which means that the volume of chips passing through the chip feeder is proportional to the number of revolutions made by the drive shaft. The volume of chips or the equivalent amount of solid wood produced can then be read directly on a simple, suitably geared revolution counter 52 connected to the drive shaft of the chip feeder.

What we claim is:

1. In a method for felling and comminuting trees into wood chips and conveying said wood chips from a relatively inaccessible area of a stand of trees to an area accessible to transport for said chips substantially without roads for large trucks in said area, the steps which comprise automatically severing whole trees from their stumps in said relatively inaccessible area with mobile apparatus dimensioned for passing through said area, automatically comminuting said trees and desirable parts thereof with said apparatus into wood chips, and pneumatically conveying substantially continuously said wood chips as they are produced by a flexible conduit from said relatively inaccessible area through said stand of trees to said transport area.

2. A method according to claim 1, comprising lifting the tree from the stump immediately upon severance and moving said tree to the infeed opening of the mobile apparatus substantially retaining the original vertical position of said tree.

3. A method according to claim 1 in which the device for feeding chips into said conduit against the pressure of the conveying air is utilized for continuous measurement of the volume of wood harvested.

References Cited

UNITED STATES PATENTS

| | | | |
|---|---|---|---|
| 2,116,603 | 5/1938 | Holly | 214—83.28 |
| 2,865,521 | 12/1958 | Fisher et al. | 214—83.28 |
| 3,223,129 | 12/1965 | Nicholson | 144—1 |

WILLIAM W. DYER, JR., *Primary Examiner.*

W. D. BRAY, *Examiner.*